(12) United States Patent
Wang et al.

(10) Patent No.: US 11,504,812 B2
(45) Date of Patent: Nov. 22, 2022

(54) METHOD FOR MAKING INFRARED LIGHT ABSORBER

(71) Applicants: Tsinghua University, Beijing (CN); HON HAI PRECISION INDUSTRY CO., LTD., New Taipei (TW)

(72) Inventors: Ying-Cheng Wang, Beijing (CN); Zhong-Zheng Huang, Beijing (CN); Yuan-Hao Jin, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 457 days.

(21) Appl. No.: 16/707,133

(22) Filed: Dec. 9, 2019

(65) Prior Publication Data
US 2020/0206846 A1 Jul. 2, 2020

(30) Foreign Application Priority Data

Dec. 29, 2018 (CN) .......................... 201811638580.1

(51) Int. Cl.
| | | |
|---|---|---|
| *B23K 26/402* | (2014.01) | |
| *G01J 5/08* | (2022.01) | |
| *B23K 26/00* | (2014.01) | |
| *B23K 26/10* | (2006.01) | |
| *B23K 26/082* | (2014.01) | |
| *B23K 103/00* | (2006.01) | |
| *B23K 101/36* | (2006.01) | |

(52) U.S. Cl.
CPC ........ *B23K 26/402* (2013.01); *B23K 26/0006* (2013.01); *B23K 26/082* (2015.10); *B23K 26/10* (2013.01); *G01J 5/0853* (2013.01); *B23K 2101/36* (2018.08); *B23K 2103/50* (2018.08)

(58) Field of Classification Search
CPC ................ B23K 26/402; B23K 26/082; B23K 26/0006; B23K 26/10
USPC .................... 252/510; 977/742, 843; 216/69; 219/121.6, 121.68, 121.79
See application file for complete search history.

(56) References Cited

U.S. PATENT DOCUMENTS

| | | | |
|---|---|---|---|
| 7,780,940 B2 | 8/2010 | Chen et al. | |
| 8,828,256 B2 | 9/2014 | Feng et al. | |
| 9,023,251 B2 * | 5/2015 | Cai .......................... | H01B 1/24 252/502 |
| 9,048,006 B2 * | 6/2015 | Feng ...................... | B82Y 30/00 |

(Continued)

FOREIGN PATENT DOCUMENTS

| | | |
|---|---|---|
| CN | 101209832 | 7/2008 |
| CN | 101993055 | 3/2011 |

(Continued)

*Primary Examiner* — Tu B Hoang
*Assistant Examiner* — Thomas J Ward
(74) *Attorney, Agent, or Firm* — ScienBiziP, P.C.

(57) ABSTRACT

A method for making an infrared light absorber is provided, and the method includes following steps: providing a first carbon nanotube array on a substrate; truncating the carbon nanotube array by irradiating a top surface of the carbon nanotube array by a laser beam in two directions, the top surface being away from the substrate, wherein the two directions being at an angle, the angle is in a range of 30 degrees to 90 degrees.

12 Claims, 11 Drawing Sheets

(56) References Cited

U.S. PATENT DOCUMENTS 9,771,266 B2 9/2017 Matsumoto et al.
2008/0238285 A1* 10/2008 Hong ..................... H01J 9/025
                                                                                 445/24

FOREIGN PATENT DOCUMENTS

| TW | 201000393 | 1/2010 |
| TW | 201242893 | 11/2012 |
| TW | 201311546 | 3/2013 |

* cited by examiner

METHOD FOR MAKING INFRARED LIGHT ABSORBER

CROSS-REFERENCE TO RELATED APPLICATIONS

This application claims all benefits accruing under 35 U.S.C. § 119 from China Patent Application No. 201811638580.1, filed on Dec. 29, 2018, in the China Intellectual Property Office, the disclosure of which is incorporated herein by reference. This application is related to applications entitled, "METHOD FOR MAKING INFRARED LIGHT ABSORBER", filed Dec. 9, 2019 Ser. No. 16/707,137, and "INFRARED DETECTOR AND INFRARED IMAGER", filed Dec. 9, 2019 Ser. No. 16/707,143.

FIELD

The subject matter herein generally relates to a method for making an infrared light absorber.

BACKGROUND

Infrared radiation is an electromagnetic wave with a wavelength between microwave and visible light. The heat of the sun is mainly transmitted to the earth through infrared radiation. At the same time, most objects in nature can be regarded as a source of infrared radiation and radiate infrared radiation continuously. At present, infrared radiation is mainly used in military and medical fields, such as scouting and diagnosing diseases. However, most of the infrared radiation is still not fully and effectively utilized. Therefore, a method to make an absorber capable of sufficiently absorbing infrared radiation so as to facilitate the applications of infrared radiation is desirable.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures

DETAILED DESCRIPTION

Figure 1:
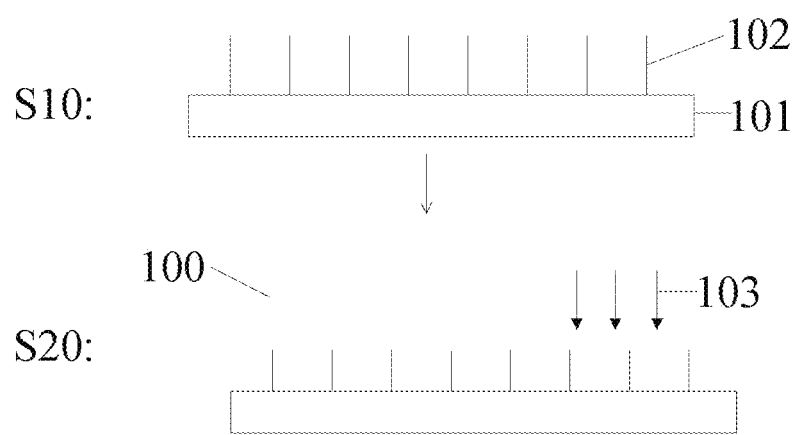
FIG. 1 is a flow chart of one embodiment of a method for making an infrared light absorber.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one".

Figure 2:
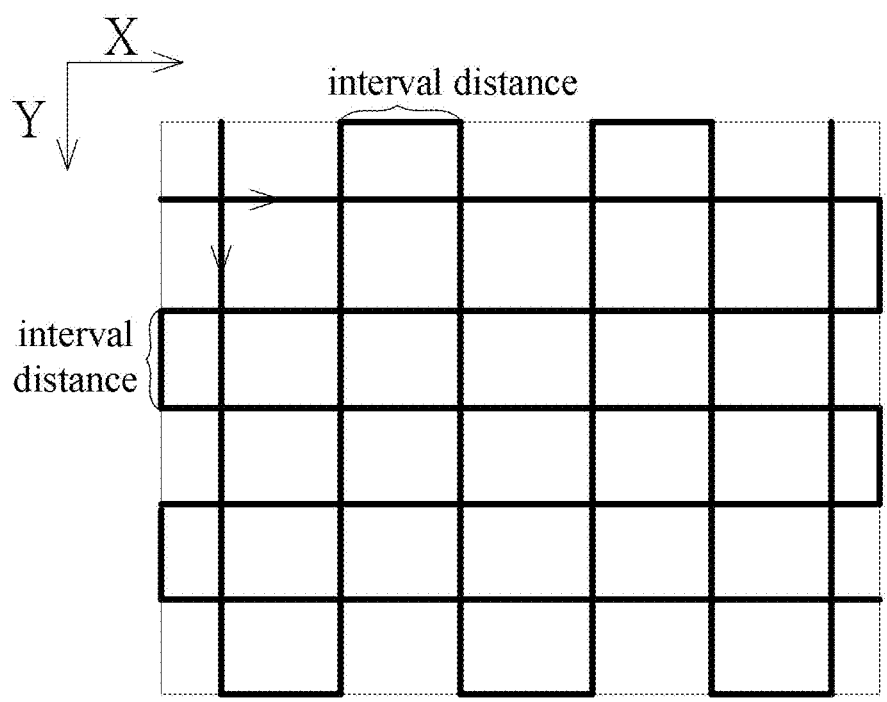
FIG. 2 is a scanning path diagram of laser beam of one embodiment.

In FIG. 1 and FIG. 2, a method for making an infrared light absorber 100 of one embodiment includes the following steps:

step (S10), providing a carbon nanotube array 102 on a substrate 101;

step (S20), irradiating a top surface of the carbon nanotube array 102 away from the substrate 101 by using a laser beam 103 in two directions to truncate the carbon nanotube array 102, and the two directions being at an angle.

In step S10, the carbon nanotube array 102 includes a plurality of carbon nanotubes, and the plurality of carbon nanotubes are arranged substantially along the same extending direction. Carbon nanotubes may be not absolutely parallel to each other because of growing conditions of the carbon nanotube array 102 cannot be controlled precisely. The plurality of carbon nanotubes can be substantially perpendicular to the substrate 101. That is, the plurality of the carbon nanotubes is parallel to a normal direction of the substrate 101. The carbon nanotube array 102 can be a super-aligned carbon nanotube array. The super-aligned carbon nanotube array is essentially free of impurities, such as carbonaceous or residual catalyst particles. The carbon nanotubes in the super-aligned carbon nanotube array are packed together closely by van der Waals attractive force. In one embodiment, the plurality of carbon nanotubes are multi-walled carbon nanotubes, and the plurality of carbon nanotubes are metallic carbon nanotubes. In one embodiment, the super-aligned carbon nanotube array is prepared by a chemical vapor deposition method.

In one embodiment, the super-aligned array of carbon nanotubes can be formed by the following steps of: (a1) providing a substantially flat and smooth substrate 101; (a2) forming a catalyst layer on the substrate 101; (a3) annealing the substrate with the catalyst at a temperature in a range from 700 Celsius degrees to 900 Celsius degrees in air for about 30 minutes (min) to 90 min; (a4) heating the substrate 101 with the catalyst at a temperature in a range from about 500 Celsius degrees to about 740 Celsius degrees in a furnace with a protective gas therein; and supplying a carbon source gas into the furnace for about 5 min to 30 min, and growing a super-aligned array of the carbon nanotubes from the substrate 101.

In step (a1): the substrate 101 can be a glass substrate, a quartz substrate, or a silicon wafer with a film of silicon dioxide thereon. In one embodiment, the substrate 101 is a silicon wafer with a film of silicon dioxide thereon. In step (a2): the catalyst layer can be formed by thermal deposition, electron beam deposition or sputtering, and the catalyst can be made of iron (Fe), cobalt (Co), nickel (Ni), or any alloy thereof. In one embodiment, the catalyst can be made of Fe.

In step (a4): the carbon source gas can be hydrocarbons such as acetylene, ethylene, and methane. In one embodiment, the carbon source gas is acetylene, the protective gas is argon, and the length of the super-aligned array of the carbon nanotubes is approximately 275 micrometers (μm).

In step S20, the carbon nanotube array 102 is irradiated by the laser beam 103 so that the messy dispersed and horizontally aligned carbon nanotubes are removed, thus the carbon nanotube array 102 is truncated such that the length of each carbon nanotube of the carbon nanotube array 102 is substantially the same, and the carbon nanotube array 102 can obtain a flat surface. Lengths of the plurality of carbon nanotubes may not be absolutely equal to each other because irradiating conditions of the laser beam cannot be controlled precisely. The length of the plurality of carbon nanotubes may have a height difference, and the height difference is less than or equal to 10 nanometers. When the carbon nanotube array 102 is irradiated by the laser beam 103, the carbon atoms in the top end of the carbon nanotube array 102 will be oxidized under a heat produced by the laser beam 103, and the lengths of the carbon nanotubes will be reduced. When the laser beam 103 irradiates the carbon nanotube array 102, an incident angle of the laser beam 103 is substantially parallel to an axial direction of carbon nanotubes in the carbon nanotube array 102. Namely, the incident angle of the laser beam 103 is substantially parallel to the normal direction of the substrate 101.

In order to describe the working process of treating the carbon nanotube array 102 by the laser beam 103, an X direction and a Y direction substantially parallel to the top surface of the carbon nanotube array 102 are defined. An angle between the X direction and the Y direction is defined as α, and the angle α is in a range of 30 degrees to 90 degrees. In one embodiment, the angle α is in a range of 60 degrees to 90 degrees. In one embodiment, the angle α is 90 degrees. When the carbon nanotube array 102 is treated by the laser beam 103, the laser beam 103 is moved in the X direction firstly to irradiate the top surface of the carbon nanotube array 102 until the plurality of carbon nanotubes are all truncated. After the laser beam 103 is moved in the X direction, the laser beam 103 is adjusted to move in the Y direction until the plurality of carbon nanotubes are all truncated again.

The laser beam 103 can be produced by a laser device. The laser device may be a solid laser, a liquid laser, a gas laser, or a semi-conductor laser. The laser beam 103 produced by the laser device is focused on the top surface of carbon nanotube array 102 and forms a laser irradiating spot, e.g., a circle area. A diameter of the laser irradiating spot can range from about 1 micrometer to about 5 micrometers. The moving speed of the laser beam 103 is less than or equal to 100 mm/sec. In one embodiment, the moving speed of the laser beam 103 is larger than 80 mm/sec. The power of the laser beam 103 is in a range of 6 W to 12 W. In one embodiment, the power of the laser beam 103 is 6 W, the diameter of the laser irradiating spot is 5 micrometers, the moving speed of the laser beam 103 is 100 mm/sec.

The laser beam 103 needs to be moved row by row in the X direction or Y direction until the plurality of carbon nanotubes are all truncated. After the laser beam 103 moves one line in the X direction, the laser beam 103 is shifted a distance in the X' direction perpendicular to the X direction, and the distance is set to an interval distance. The interval distance can range from about 1 micrometer to about 20 micrometers. In one embodiment, the interval distance is the same as the diameter of the laser irradiating spot. After shifting the laser beam 103, the laser beam 103 continues to move in the X direction until the plurality of carbon nanotubes are all truncated. After the top surface of the carbon nanotube array 102 is irradiated by the laser beam 103 in the X direction, the laser beam 103 begins to move in the Y direction until the plurality of carbon nanotubes are all truncated. After the carbon nanotube array 102 is irradiated by the laser beam 103 in two directions, and the two directions are defined as the X direction and the Y direction, the height of the carbon nanotube array 102 is larger than 3 micrometers. In one embodiment, the height of the carbon nanotube array 102 is a range of 100 micrometers to 300 micrometers.

A plurality of gaps are formed between the plurality of carbon nanotubes in the carbon nanotube array 102. The plurality of gaps can capture and confine photons in the carbon nanotube array 102, and the photons can be scattered and absorbed by carbon nanotubes. Since the height of the carbon nanotube array 102 is large, the incident infrared light is completely absorbed before reaching the substrate 101. The absorption rate of the carbon nanotube array 102 can be expressed by "1-R", wherein the R represents reflectivity. Since the reflectivity R to infrared light is small, the carbon nanotube array 102 can be used as the infrared light absorber. Before the carbon nanotube array 102 is irradiated by the laser beam 103, the absorption rate of the carbon nanotube array 102 is not very large, because the top surface of the carbon nanotube array 102 may have dispersed laterally aligned carbon nanotubes or the difference in height of the plurality of carbon nanotubes may cause the top surface of the carbon nanotube array 102 to be uneven. Therefore, more infrared light is reflected on the top surface of the carbon nanotube array 102, resulting in a decrease in the absorption rate of the carbon nanotube array 102. The laser beam 103 can cut the plurality of carbon nanotubes of the carbon nanotube array 102 to remove the dispersed laterally aligned carbon nanotubes and obtain carbon nanotubes of approximately the same height.

Figure 3:
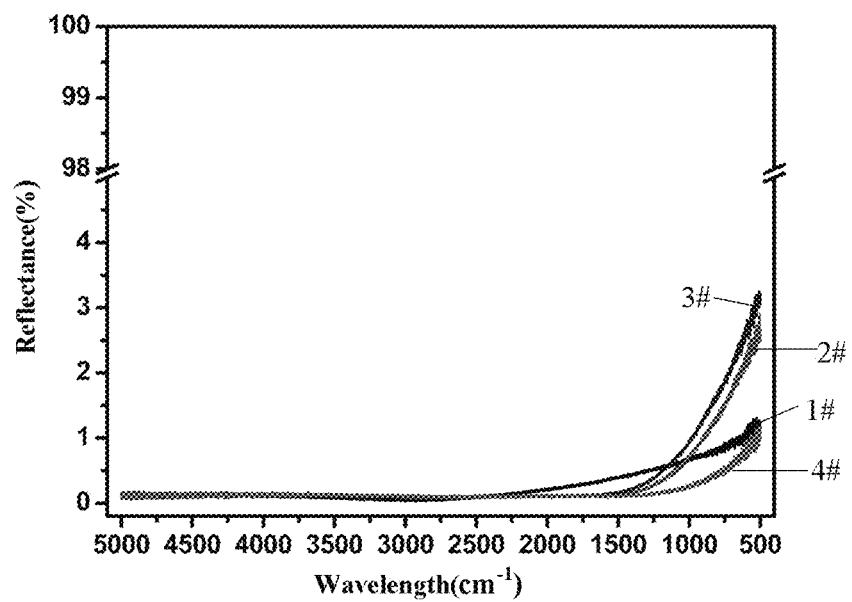
FIG. 3 is a reflectance spectra of a carbon nanotube array in the infrared radiation region before and after laser beam treatment.
Figure 4A:
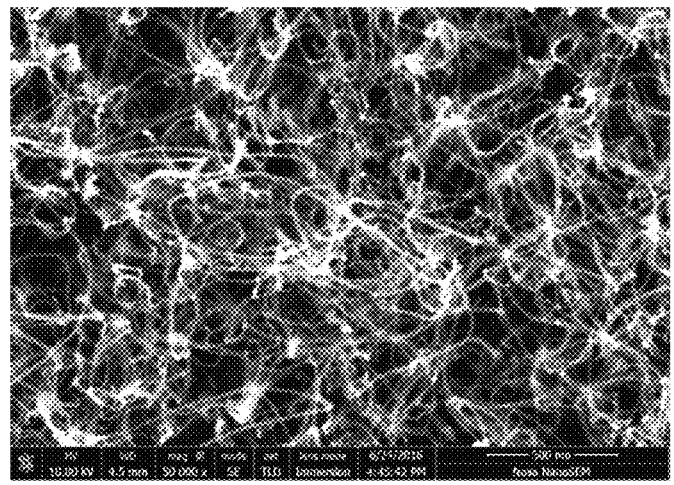
FIG. 4a is a Scanning Electron Microscope (SEM) image of a carbon nanotube array before laser beam treatment.
Figure 4B:
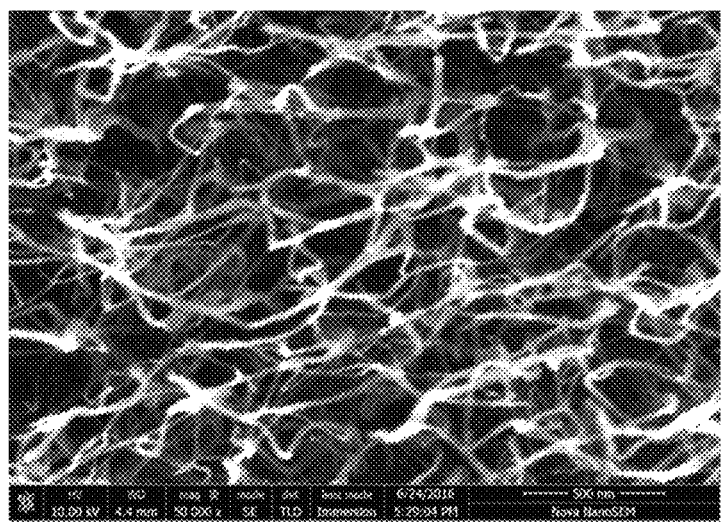
FIG. 4b is an SEM image of a carbon nanotube array after laser beam treatment.

Referring to FIG. 3, curve 1 # is the reflectance curve of infrared light of the carbon nanotube array 102 without any treatment, curve 2 # and curve 3 # are the reflectance curves of infrared light of the carbon nanotube array 102 irradiated by the laser beam 103 in one direction, curve 4 # is the reflectance curve of infrared light of the carbon nanotube array 102 irradiated by the laser beam 103 in two directions. The reflectivity of the carbon nanotube array 102 irradiated by the laser beam 103 in only one direction is higher than the reflectivity of the carbon nanotube array 102 without any treatment, and the reflectivity of the carbon nanotube array 102 irradiated by the laser beam 103 in two directions is lower than the reflectivity of the carbon nanotube array 102 without any treatment. After the carbon nanotube array 102 is irradiated by the laser beam 103 in only one direction, since the end of the carbon nanotube away from the substrate 101 is bent in the direction in which the laser beam 103 moves, and the extending direction of the bent portion of the carbon nanotube is approximately parallel to the surface of the substrate 101, the bent portion of the carbon nanotubes can improve the reflectivity of the carbon nanotube array 102. But after the carbon nanotube array 102 is irradiated by the laser beam 103 in two directions, the two directions consist of a first direction and a second direction, and the first direction is different from the second direction. When the carbon nanotube array 102 is irradiated by the laser beam 103 in the second direction, the movement of the laser beam 103 can alleviate the bending of the carbon nanotubes caused by the first direction. Therefore, after the carbon nanotube array 102 is irradiated by the laser beam 103 in two directions, the top surface of the carbon nanotube array 102 has no dispersed laterally aligned carbon nanotubes and the height of the plurality of carbon nanotubes are uniform, the top surface of the carbon nanotube array 102 is flat. After the carbon nanotube array 102 is irradiated by the laser beam 103 in the two directions, the plurality of carbon nanotubes of the carbon nanotube array 102 are substantially perpendicular to the surface of the substrate 101. Since the carbon nanotube array 102 can absorb and emit infrared light, the absorption rate of the infrared light of the carbon nanotube array 102 can be obtained by directly measuring the absorption rate or calculating the emissivity. Referring to FIG. 3, after the carbon nanotube array 102 is irradiated by the laser beam 103 in the two directions, the carbon nanotube array 102 has a reflectivity of less than 0.5% for infrared light having a wavelength of from 2 micrometers to 20 micrometers. Therefore, the carbon nanotube array 102 can have a high absorption rate for infrared light having a broad spectrum, and the absorption rate can be larger than 99.5%. The carbon nanotube array 102 irradiated by the laser beam 103 in the two directions can be used as the infrared light absorber to absorb infrared light. Referring to FIGS. 4a and FIG. 4b, FIG. 4a is a SEM image of the carbon nanotube array 102 before irradiated by the laser beam 103; FIG. 4b is a SEM image of the carbon nanotube array 102 after irradiated by the laser beam 103. The messy dispersed and horizontally aligned carbon nanotubes are removed by the laser beam 103.

Figure 5:
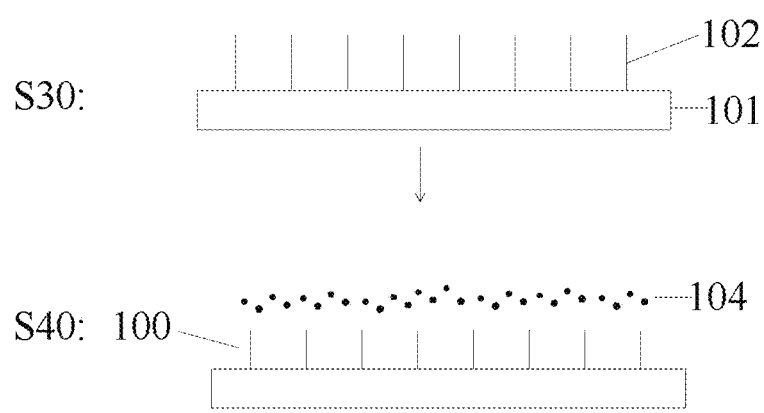
FIG. 5 is a flow chart of one embodiment of a method for making an infrared light absorber.

Referring to FIG. 5, a method for making the infrared light absorber 100 of another embodiment includes the following steps:

step (S30), providing a carbon nanotube array 102 on a substrate 101;

step (S40), etching a top surface of the carbon nanotube array 102 away from the substrate 101 by dry etching.

The method for making the infrared light absorber 100 of one embodiment is similar with the infrared light absorber 100 of another embodiment except that the infrared light absorber 100 of another embodiment is obtained by dry etching the carbon nanotube array 102 to shorten the carbon nanotubes so that the length of the plurality of carbon nanotubes is substantially the same.

In step S40, the method for dry etching the top surface of the carbon nanotube array 102 can be reactive ion etching or inductively coupled plasma etching. In the process of etching the carbon nanotube array 102 using a plasma 104, the etching direction is parallel to the growth direction of the carbon nanotube array 102. The etching direction is from the top surface of the carbon nanotube array 102 toward the substrate 101 along the long axis direction of the carbon nanotube. The carbon nanotubes in the carbon nanotube array 102 are etched and truncated, wherein the laterally aligned carbon nanotubes dispersed on the surface of the carbon nanotube array 102 can be removed, and the length of carbon nanotubes can be substantially the same.

Figure 6:
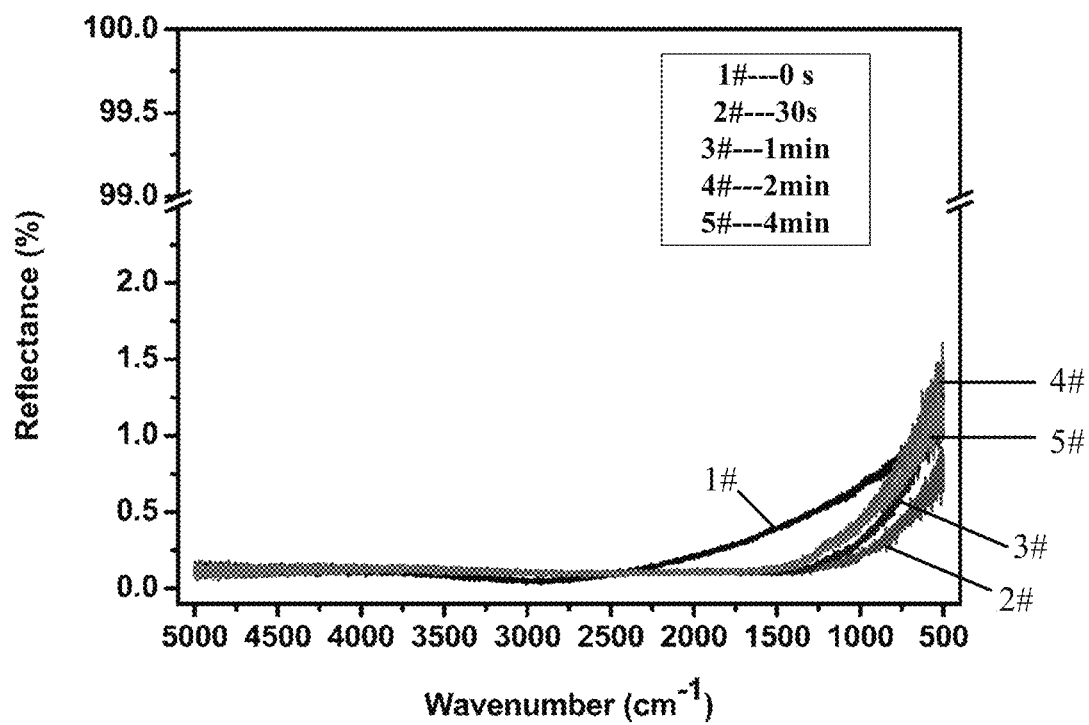
FIG. 6 is a reflectance spectra of a carbon nanotube array in the infrared radiation region before and after etching treatment.
Figure 7A:
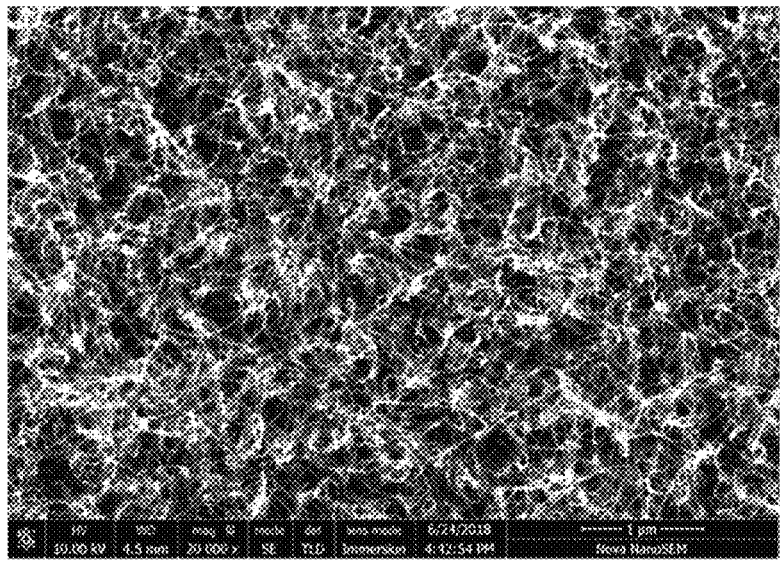
FIG. 7a is an SEM image of a carbon nanotube array before etching treatment.
Figure 7B:
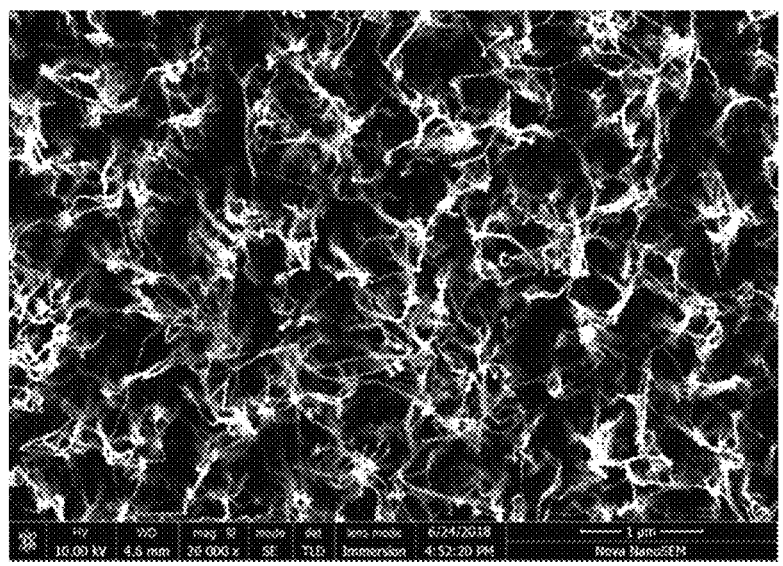
FIG. 7b is an SEM image of a carbon nanotube array after etching treatment.
Figure 8A:
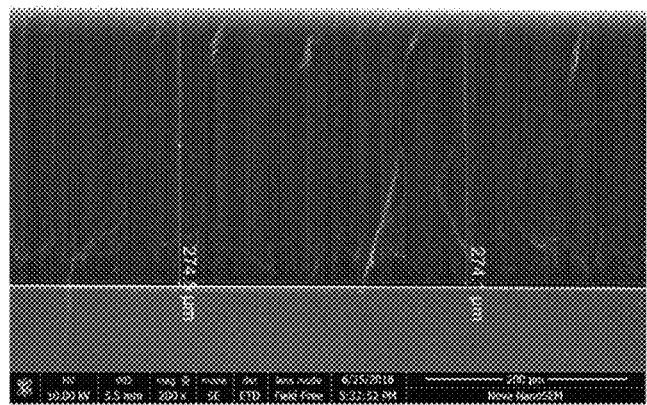
FIG. 8a is an SEM image of a side of a carbon nanotube array before etching treatment.
Figure 8B:
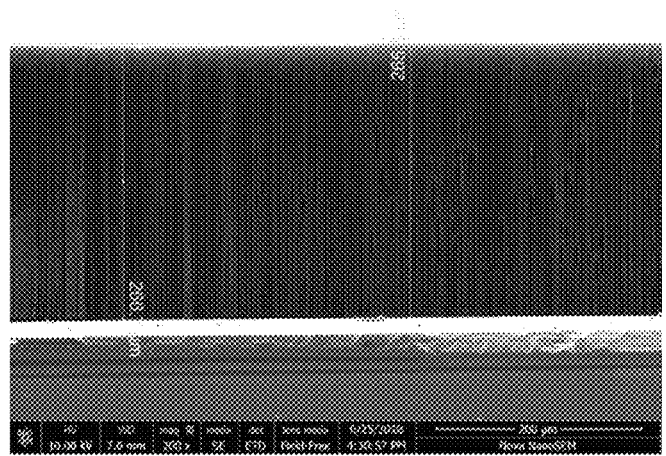
FIG. 8b is an SEM image of a side of a carbon nanotube array after etching treatment.

In one embodiment, the carbon nanotube array 102 is etched by reactive ion etching, the gas introduced during etching is oxygen. The power of dry etching is in a range of 50 watts to 150 watts. In one embodiment, the power of dry etching is in a range of 100 watts to 150 watts. The oxygen access rate is 50 standard-state cubic centimeter per minute (sccm). The air pressure is 10 Pa. The dry etching time is in a range of 30 seconds to 240 seconds. In one embodiment, the dry etching time is in a range of 30 seconds to 60 seconds. After the etching process, the height of the carbon nanotube array 102 is larger than 3 micrometers. In one embodiment, the height of the carbon nanotube array 102 is in a range of 100 micrometers to 300 micrometers. Referring to FIG. 6, curve 1 # is the reflectance curve of infrared light of the carbon nanotube array 102 without any treatment, curve 2 # is the reflectance curves of infrared light of the carbon nanotube array 102 etched for 30 seconds, curve 3 # is the reflectance curves of infrared light of the carbon nanotube array 102 etched for 60 seconds, curve 4 # is the reflectance curves of infrared light of the carbon nanotube array 102 etched for 2 minutes, curve 5 # is the reflectance curves of infrared light of the carbon nanotube array 102 etched for 4 minutes. The reflectivity of the carbon nanotube array 102 etched for infrared light is lower than the reflectivity of the carbon nanotube array 102 without any treatment for infrared light. The wavelength of the infrared light is in a range of 2 micrometers to 20 micrometers. The reflectivity of the carbon nanotube array 102 for infrared light etched for 30 seconds to 60 seconds is far lower than the reflectivity of the carbon nanotube array 102 for infrared light etched for more than 60 seconds. Referring to FIG. 7a and FIG. 7b, FIG. 7a is a SEM image of the carbon nanotube array 102 before etching treatment; FIG. 7b is a SEM image of the carbon nanotube array 102 after etching treatment. The messy dispersed and horizontally aligned carbon nanotubes can be removed by etching treatment. Referring to FIG. 8a and FIG. 8b, FIG. 8a is a side SEM image of the carbon nanotube array 102 before etching treatment; FIG. 8b is a side SEM image of the carbon nanotube array 102 after etching treatment. The length of the carbon nanotubes in the carbon nanotube array 102 is truncated, and the surface of the carbon nanotube array 102 is flat after truncation.

Figure 9:
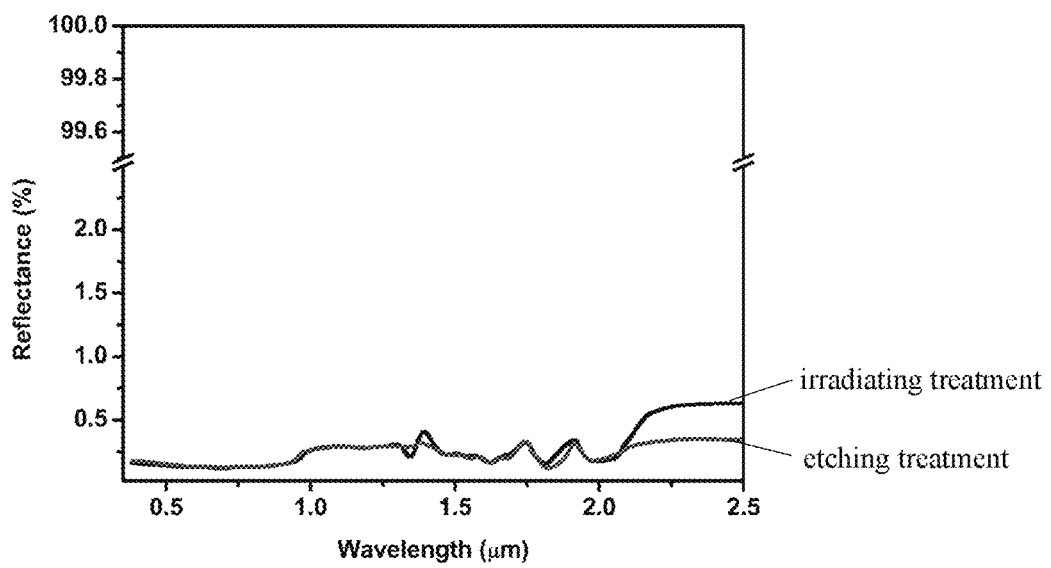
FIG. 9 is a reflectance spectra of a carbon nanotube array in the infrared radiation region after laser beam treatment and after etching treatment.

The wavelength in a range of 0.4 micrometers to 2.5 micrometers is selected to test the absorption rate of the infrared light of the carbon nanotube array 102. Referring to FIG. 9, the absorption rate of the infrared light of the carbon nanotube array 102 can be equal to or more than 99.5%, after the carbon nanotube array 102 is treated by irradiating or etching. Thus, the infrared light absorber 100 and the infrared light absorber 200 have a high absorption rate of the infrared light. When the wavelength of the infrared light is in a range of 2.1 micrometers to 2.5 micrometers, the absorption rate of the carbon nanotube array 102 treated by dry etching is higher than the absorption rate of the carbon nanotube array 102 treated by the laser beam 103.

Figure 10:
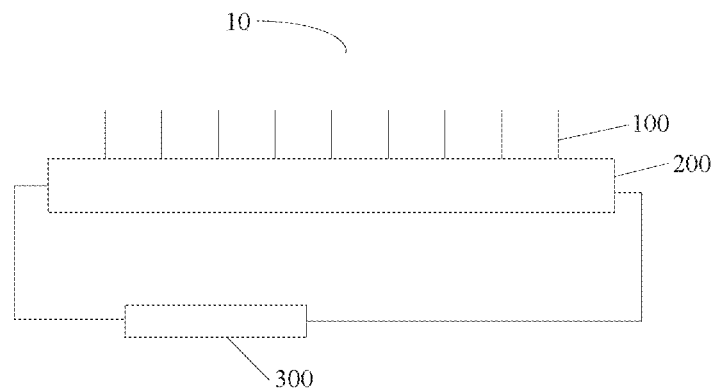
FIG. 10 is a schematic view of one embodiment of an infrared detector.

Referring to FIG. 10, an infrared detector 10 of an embodiment is provided. The infrared detector 10 includes an infrared light absorber 100, a thermoelectric element 200, and an electrical signal detector 300. The infrared light absorber 100 includes a carbon nanotube array, and the carbon nanotube array includes a plurality of carbon nanotubes. The plurality of carbon nanotubes have substantially the same height. The infrared light absorber 100 is located on and in contact with the thermoelectric element 200. The plurality of carbon nanotubes are perpendicular to a surface of the thermoelectric element 200. The electrical signal detector 300 is electrically connected to the thermoelectric element 200, and the electrical signal detector 300 and the thermoelectric element 200 are electrically connected in series to form a circuit. The electrical signal detector 300 is configured to detect a change of electrical performance of the thermoelectric element 200.

The infrared light absorber 100 is configured to absorb infrared light and convert infrared light into heat. The infrared light absorber 100 is obtained by the method of the above embodiments. The infrared light absorber 100 has a high absorption rate for infrared light having a wavelength of 4 micrometers to 25 micrometers. In one embodiment, the infrared light absorber 100 has a high absorption rate for infrared light having a wavelength of 8 micrometers to 15 micrometers. In one embodiment, the infrared light absorber 100 has a high absorption rate for infrared light having a wavelength of 10 micrometers. The absorption of the infrared light is achieved by the carbon nanotube array 102. The temperature of the carbon nanotube array 102 is increased after absorbing the infrared light. Since the carbon nanotubes have a high thermal conductivity, the carbon nanotube array 102 is capable of efficiently transferring heat to the thermoelectric element 200. Thus, the responsiveness and sensitivity of the thermoelectric element 200 can be greatly increased.

The thermoelectric element 200 is in contact with the infrared light absorber 100, and the carbon nanotubes can transfer the heat absorbed by the infrared light absorber 100 to the thermoelectric element 200. The carbon nanotube array 102 is configured to transfer the heat to the thermoelectric element 200 along extending directions of the plurality of carbon nanotubes. The carbon nanotube array 102 is located on the surface of the thermoelectric element 200. The carbon nanotube array 102 can be directly grown on the surface of the thermoelectric element 200, or can also be directly disposed on the surface of the thermoelectric element 200 by transferring. The infrared light absorber 100 can be obtained by irradiating or etching the carbon nanotube array 102 located on the thermoelectric element 200. The method for transferring the carbon nanotube array 102 can be a conventional method for transferring the carbon nanotube array. The infrared light absorber 100 can be prepared before or after the carbon nanotube array are transferred to the thermoelectric element 200.

The temperature of the thermoelectric element 200 is raised after the thermoelectric element 200 absorbs heat, so that the electrical properties of the thermoelectric element 200 can be changed. The thermoelectric element 200 can be pyroelectric element, thermistor or thermocouple element. The thermoelectric element 200 is a material having a high thermoelectric coefficient, such as lead zirconate titanate ceramics, lithium tantalate, lithium niobate, tripotassium sulfate. The thermistor can be a semiconductor thermistor, a metal thermistor, an alloy thermistor. In one embodiment, the thermoelectric element 200 is lead zirconate titanate ceramics, the thermoelectric element 200 is in a shape of a rectangle, and the length of the thermoelectric element 200 is 2 micrometers, the length of the thermoelectric element 200 is 1 micrometer.

Figure 11:
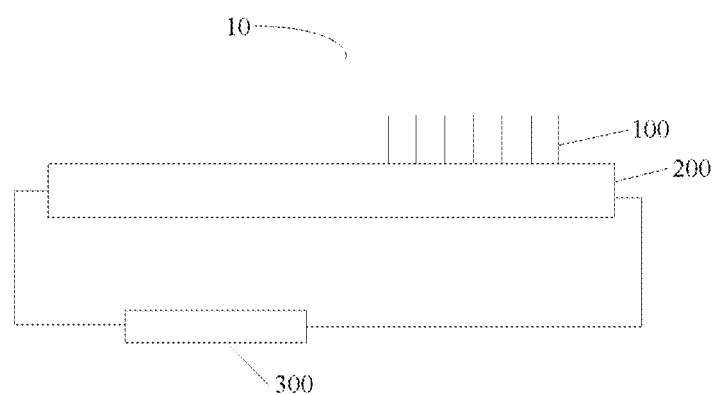
FIG. 11 is a schematic view of one embodiment of an infrared detector with a thermocouple.

In one embodiment, the thermoelectric element 200 is a pyroelectric element. A voltage or current can be generated in the pyroelectric element by increasing the temperature of the pyroelectric element. The electrical signal detector 300 can be a current-to-voltage converter and configured to detect the change of the voltage or current of the thermoelectric element 200. In one embodiment, the thermoelectric element 200 is a thermistor. The resistance of the thermistor is changed by increasing the temperature of the thermistor. The electrical signal detector 300 can comprise a power supply and a current detector and configured to detect a change in resistance of the electrical signal detector 300. Referring to FIG. 11, in one embodiment, the thermoelectric element 200 is a thermocouple element, the infrared light absorber 100 should be disposed at only one end or one part of the thermocouple element 200. Thus, a temperature difference can be generated between two ends of the thermocouple element 200. The temperature difference leads to a potential difference between two ends of the thermocouple element. The electrical signal detector 300 can be a voltage detector and configured to detect the potential change of the thermoelectric element 200.

When the infrared detector 10 is in operation, the infrared light irradiates the infrared light absorber 100, the carbon nanotubes can convert the infrared light into heat and transmit the heat to the thermoelectric element 200; the temperature of the thermoelectric element 200 raises after absorbing the heat, and the electrical properties such as resistance, current or voltage of the thermoelectric element 200 are changed; the electrical signal detector 300 is capable of detecting a change of the electrical properties of the thermoelectric element 200, that is, the electrical signal detector 300 is capable of detecting the infrared light.

Figure 12:
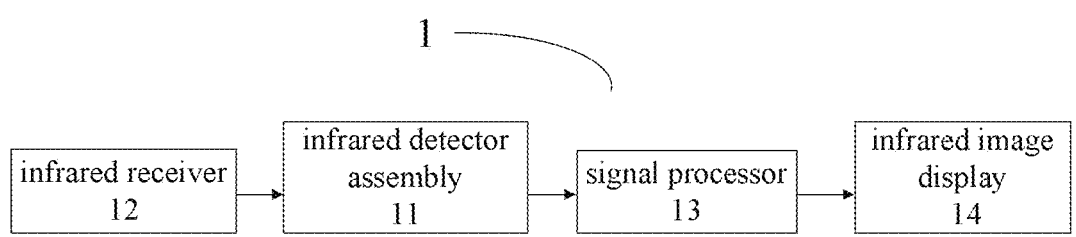
FIG. 12 is a schematic view of one embodiment of an infrared imager.

Referring to FIG. 12, an infrared imager 1 of an embodiment is provided. The infrared imager 1 includes an infrared receiver 12, an infrared detector assembly 11, a signal processor 13, and an infrared image display 14. The infrared receiver 12 is configured to receive an infrared light and transmit the infrared light to the infrared detector assembly 11. The infrared detector assembly 11 is configured to convert the infrared light into an electrical signal and transmit the electrical signal to the signal processor 13. The signal processor 13 is configured to process the electrical signal to obtain thermal field distribution data. The infrared image display 14 is configured to display an infrared thermal image according to the thermal field distribution data.

The infrared receiver 12 is configured to receive an infrared light emitted by an object. In one embodiment, the infrared receiver 12 is infrared lens. After the infrared light emitted by the object is received by the infrared lens, it is directly transmitted to the infrared detector assembly 11.

The infrared detector assembly 11 includes a plurality of infrared detectors 10. The plurality of infrared detectors 10 are arranged to form a two-dimensional array, and each of the plurality of infrared detectors 10 can convert the infrared light into an electrical signal. Each infrared detector 10 is equivalent to one pixel, so the infrared detector assembly 11 can detect the object by the infrared light emitted by the object. The distance between two adjacent infrared detectors 10 can be selected according to the need.

The signal processor 13 is configured to process the electrical signal of each infrared detector 10 to obtain the thermal field distribution data of the object. The signal processor 13 can calculate the temperature data of each position of the object according to the electrical signal of each infrared detector 10. The temperature data can form the thermal field distribution data of the object.

The infrared image display 14 is configured to display the infrared thermal image according to the thermal field distribution data. Different temperatures can be displayed in different colors in the infrared thermal image. Thus, the infrared thermal image can reflect the temperature of each position of the object. For example, when the infrared imager 1 is used in the medical field, it can be used for thermal imaging of the human body, so the doctors can determine the disease and the extent of the disease in different parts of the body according to the infrared thermal image.

When the infrared imager 1 is in operation, the infrared light emitted by the object is received by the infrared receiver 12; the infrared receiver 12 receives the infrared light and transmits the infrared light to the infrared detector assembly 11; the infrared detector assembly 11 converts the infrared light into the electrical signal and transmit the electrical signal to the signal processor 13; the signal processor 13 processes the electrical signal to obtain thermal field distribution data; the infrared image display 14 is configured to display an infrared thermal image according to the thermal field distribution data.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A method for making an infrared light absorber, the method comprising:
   providing a carbon nanotube array on a substrate;
   truncating the carbon nanotube array by irradiating a top surface of the carbon nanotube array by a laser beam in two directions, the top surface being away from the substrate;
   wherein the two directions intersects at an angle, the angle is in a range of 30 degrees to 90 degrees, the two directions are defined as an X direction and a Y direction, and the method of irradiating the top surface of the carbon nanotube array comprising:
   irradiating the top surface of the carbon nanotube array row by row in the X direction until all the top surface of the carbon nanotube array is irradiated; and
   irradiating the top surface of the carbon nanotube array row by row in the Y direction until all the top surface of the carbon nanotube array are truncated after irradiating the top surface of the carbon nanotube array in the X direction.

2. The method of claim 1, wherein the carbon nanotube array comprises a plurality of carbon nanotubes substantially parallel with each other.

3. The method of claim 2, wherein the plurality of carbon nanotubes are multi-walled carbon nanotubes.

4. The method of claim 2, the plurality of carbon nanotubes in the carbon nanotube array are truncated to a height in a range of 100 micrometers to 300 micrometers.

5. The method of claim 2, wherein extending directions of the plurality of carbon nanotubes are substantially parallel to a normal direction of the substrate.

6. The method of claim 5, wherein an incident angle of the laser beam is parallel to the normal direction of the substrate.

7. The method of claim 1, wherein a moving speed of the laser beam is less than or equal to 100 mm per second, the laser beam is produced by a laser device, and a power of the laser device is in a range of 6 W to 12 W.

8. The method of claim 7, wherein the moving speed of the laser beam is larger than 80 mm per second.

9. The method of claim 1, wherein an interval distance between two adjacent rows ranges from approximately 1 micrometer to approximately 20 micrometers.

10. The method of claim 9, wherein a laser irradiating spot is formed by the laser beam, and a diameter of the laser irradiating spot is same as the interval distance.

11. The method of claim 1, wherein the X direction is parallel to the substrate, and the Y direction is parallel to the substrate.

12. The method of claim 1, wherein the top surface of the carbon nanotube array is irradiated in the X direction to obtain a first surface, the top surface of the carbon nanotube array is irradiated in the Y direction to obtain a second surface, the first surface and the second surface are coincident.

* * * * *